United States Patent [19]

Moran et al.

[11] 3,854,337

[45] Dec. 17, 1974

[54] CHARGE STORAGE DEVICE

[75] Inventors: Paul R. Moran, Madison, Wis.;
Ervin B. Podgorsak, Toronto,
Ontario, Canada

[73] Assignee: **The United States of America as
represented by the United States
Atomic Energy Commission,**
Washington, D.C.

[22] Filed: Oct. 1, 1973

[21] Appl. No.: 402,412

[52] U.S. Cl. ............................................. 73/362 R
[51] Int. Cl. ............................................ G01k 7/00
[58] Field of Search .................. 73/362 R, 362 SC;
324/60 R, 60 C; 307/88 ET; 252/63.2; 317/258

[56] References Cited
UNITED STATES PATENTS 2,909,662  10/1959  von Hippel..................... 73/362 SC
3,458,713  7/1969  Perlman.......................... 307/88 ET
3,652,932  3/1972  Sessler ............................. 324/60 R Primary Examiner—Richard C. Queisser
Assistant Examiner—Denis E. Corr
Attorney, Agent, or Firm—John A. Horan; Arthur A. Churm; Paul Gottlieb

[57] ABSTRACT

A temperature programmable charge storage device is provided having dielectric material composed of an ionic solid doped with a dominant impurity. The dielectric is interposed between two electrodes of electrical conductivity less than the ionic conductivity of the doped dielectric and means are provided for heating the dielectric to program the charge-discharge rate of the device.

7 Claims, 5 Drawing Figures

PATENTED DEC 17 1974
3,854,337
SHEET 1 OF 2
Fig-1
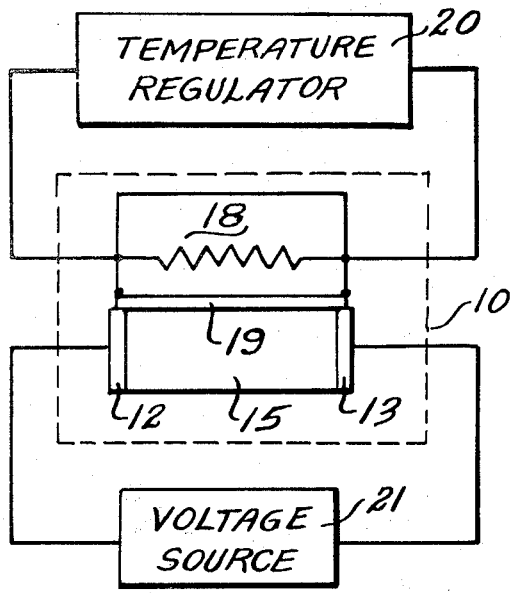
Fig-4
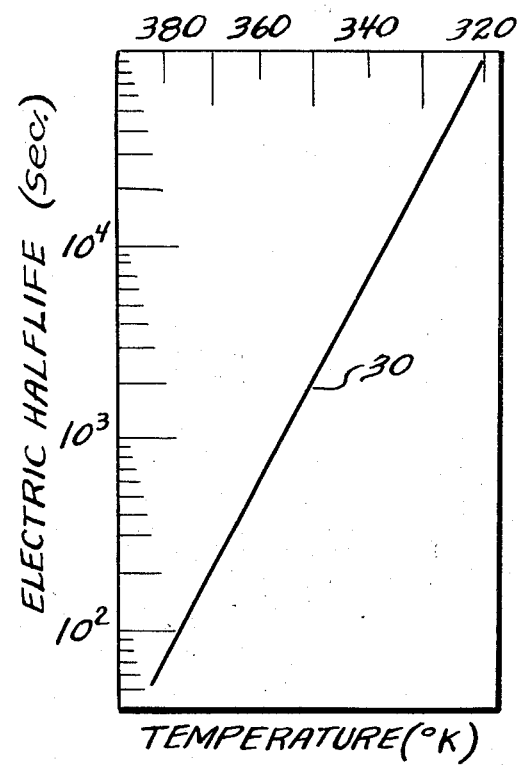
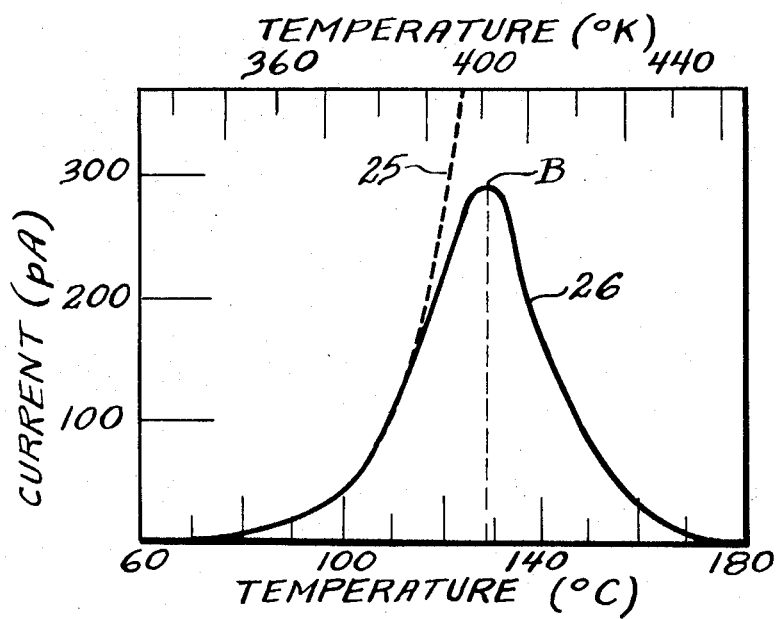
Fig-2

3,854,337
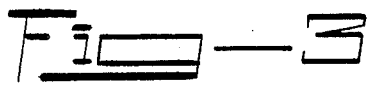
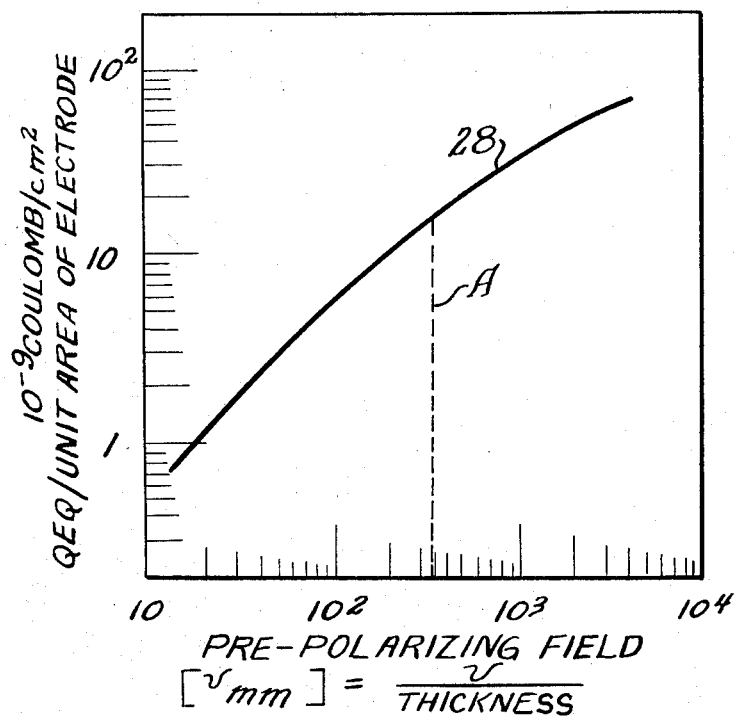
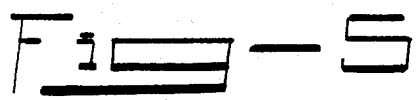
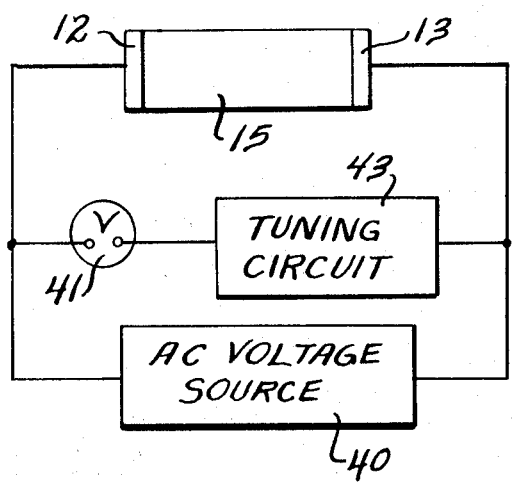

CHARGE STORAGE DEVICE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

In an ordinary capacitor, the charging rate, which is the collection of charges $Q$ on its electrodes due to a time-dependent voltage $V(t)$ applied across its terminals, is defined by the expression $$dQ/dt = 1/t\ (Q - Q_{EQ})$$

where $Q_{EG} = V(T)C$ and $1/t = 1/RC$. $1/RC$, which relates the intrinsic resistance $(R)$ and the device capcitance $(C)$, is relatively independent of temperature. Thus, $dQ/dt$, the charging rate of an ordinary capacitor being dependent upon time, cannot be programmed or controlled by another external physical force such as temperature. Programmability is desirable as an analytical tool and for providing variable circuit response.

The device capacitance $(C)$ depends upon the geometry of the device and the intrinsic characteristics of the dielectric. Therefore, to increase the charge storage capacity of a capacitor made of a particular dielectric material, it is necessary to increase the size of the device. With a material having a relatively high device capacitance, a capacitor can be smaller than the one with a lower device capacitance to achieve the same total charge storage capacity.

It is therefore an object of this invention to provide a charge storage device having a temperature programmable charge-discharge rate.

Another object of this invention is to provide a charge storage device of greatly increased device capacitance.

Another object of this invention is to provide a remotely read temperature sensor.

SUMMARY OF THE INVENTION

Temperature programmability in a charge storage element is achieved using a dielectric composed of an ionic solid material. The dielectric is doped with a dominant impurity having a concentration at least six times greater than The concentration of all other impurities combined. The electrical conductivity of the two electrodes must be less than the ionic conductivity of the dielectric. When a voltage is applied to the electrodes, a charge due to electret polarization collects at the electrodes at a charging rate dependent upon the dielectric temperature and discharges at a rate similarly dependent upon temperature.

DESCRIPTION OF THE DRAWINGS

FIG. 1 is a schematic of the temperature programmable charge storage device;

FIG. 2 is a set of curves of the ionic conduction current and depolarization current of the dielectric material;

FIG. 3 is a curve of the equilibrium charge on the charge storage device versus voltage;

FIG. 4 is a curve of the charge-discharge half-life versus temperature of the charge storage device; and FIG. 5 is a schematic of a remotely read temperature sensor.

DETAILED DESCRIPTION

Referring to FIG. 1, there is shown a temperaturee programmable charge storage device 10. It includes a dielectric material 15 interposed between a pair of electrodes 12 and 13. The temperature of dielectric 15 may be controlled by a resistance heating element 18 which is electrically insulated from dielectric 15 by insulator 19. Insulator 19 should be of a high electrical resistance and best results are obtained if it is of a material such as mica. Heating element 18 is coupled to a temperature regulator 20 which for a resistance heating element could be a variable D-C voltage source. By varying the voltage, the heat generated by the heating element is likewise varied so that the temperature of the dielectric may be externally programmed. Other controllable means of varying the temperature of dielectric 15 are apparent, such as blowing preheated gases across the dielectric.

Dielectric 15 should be composed of an ionic solid material. An ionic solid is a material in which electrical conductivity due to an applied electric field arises from movement of positive and negative ions rather than by movement of electrons and holes. The ionic solid should be doped so that the conductivity of the material will be nonintrinsic impurity induced ionic conductivity. An example of a satisfactory material for dielectric 15 is doped $CaF_2$. To practice the invention herein disclosed, the doping of the $CaF_2$ should be with a nonintrinsic element, for example a trivalent element such as a rare earth or aluminum and be of a purity so that one particular element such as Ce is dominant. Dominance of one type of impurity is considered adequate when the ratio of the concentration of that impurity is at least six times the concentration of all other impurities combined.

Dielectric 15 need not be in crystalline form. Extrusions, sintered tablets, and ceramics work well. The material need not even be of electrical integrity. Ground up $CaF_2$, in a fine powder and dispersed 10 percent by volume in an epoxy matrix, will show the same response as a single crystal of $CaF_2$ except its strength is down to 10 percent due to the filling factor.

Voltage is applied to electrodes 12 and 13 by voltage source 21 to induce a highly polarized state in dielectric 15. The voltage may e D.C. or A.C. to charge the device. However, if A.C. is applied, then the frequency may not be so high as to be alternating too fast for the highly polarized state to correspondingly alternate. Electrodes 12 and 13 should be blocking electrodes having an electrical conductivity less than the ionic conductivity of dielectric 15 to prevent injection of charge carriers from electrodes 12 and 13 into dielectric 15 which would interfere with the formation of the polarized state. If the electrical conductivity of electrodes 12 and 13 is not smaller than the ionic conductivity of dielectric 15, then a piece of material of high electrical resistance such as Mylar should be interposed betweeb each electrode and dielectric 15 to prevent charge carrier injection. For a dielectric of doped $CaF_2$ electrodes of aluminum, silver or copper are adequate. For other dielectric materials, aluminum electrodes oxidized to form an aluminum oxide layer between the electrodes and the dielectric were adequate.

In response to the voltage, there will develop relatively instantaneously a charge on electrodes 12 and 13 due to the ordinary capacitance C of dielectric 15. C depends upon the geometry of a capacitor element and the dielectric constant. Any ionic solid will exhibit properties of an ordinary dielectric. At low temperatures where the rate of charge storage, due to the polarization response to be described, is so slow as to be virtually undetectable over a usable time frame, charge storage device 10 behaves as an ordinary capacitor. At higher temperatures, for CaF$_2$ about 75°C., the charge storage rate associated with the electret polarization will be so fast and of such a relatively large quantity that it will dominate the ordinary capacitive behavior of dielectric 15 which can then be neglected.

Under the influence of the voltage, the ionic solid of dielectric 15 behaves like an electret. An electret is a material exhibiting a high electrical polarizability. When a voltage is applied to such a material, its polarization relaxes from zero toward an equilibrium value with a particular relaxation time, and when the voltage is removed, the polarization relaxes back to zero in the same relaxation time. The relaxation time is strongly dependent upon a physical parameter other than time. A thermoelectret, whose relaxation time is temperature dependent, will have a very short relaxation time, perhaps $10^{-3}$ seconds, at high temperatures and a very long relaxation time, perhaps $10^3$ years at low temperatures. By varying the temperature, this rate of relaxation can be varied.

The mechanism by which electret polarization occurs in the ionic solid of dielectric 15 due to the applied voltage is nonintrinsic impurity induced ionic conductivity. For example, consider the response of dielectric 15 composed of CaF$_2$ doped with a dominant impurity of Ce. At all temperatures a certain percent of the F$^{-1}$ ions will dissociate from the dominant impurity Ce and under the influence of the voltage applied to electrodes 12 and 13, the F$^{-1}$ will then migrate to the electrode which is at a positive potential, creating a space charge polarization or electret state. Note that this is what limits the frequency of the applied voltage previously discussed, since the F$^{-1}$ must have time to move between the electrodes for the electret to respond to the alternating polarity of the electrodes. As the temperature is increased, a greater percentage of the F$^{-1}$ will dissociate and the rate at which they migrate will increase, thereby accentuating this ionic conductivity. This is illustrated in FIG. 2, by curve 25, which shows the variation in the ionic conductivity in the CaF$_2$ dielectric 15 with respect to temperature varied at the rate of 0.5°K per second. A different dielectric material with different impurity characteristics and with different impurity concentration will exhibit a different ionic conductivity. The higher the concentration of impurity, the greater the polarization and the lower the temperature at which the ionic conductivity becomes significant. As will be described, at a particular maximum temperature, the ionic solid no longer exhibits a predictable electret state. Thus, by varying the selection of dielectric 15 and its dominant impurity and thereby controlling the temperature range over which the ionic conductivity is significant, a useful temperature range of the device can be predetermined.

To compensate for the polarization effect on dielectric 15, charge must accumulate on electrodes 12 and 13. The rate at which this accumulation of charge Q occurs has been determined to be described generally by the expression $$dQ/dt = \gamma_{(T)}(Q_{EQ}^2 - Q^2)$$

where $\gamma_{(T)}$ is a relaxation factor dependent on temperature and $Q_{EQ}$ is the equilibrium charge which will accumulate on electrodes 12 and 13 due to a particular voltage applied to electrodes 12 and 13. With all other things being equal, the above expression will describe both the charging and discharging rate of the device 10. It is the predictability of response of the electret state which allows device 10 to be temperature programmed. $Q_{EQ}$ is defined by the expression $$Q_{EQ} = A \times 2\, C_e\, [v_B^{1/2}[V + v_B^{1/2}]^{1/2} - v_B]$$

where $A$ is the electrode area, $V$ is the applied voltage, $v_B$ is a break point voltage and $C_e$ is the specific electret capacitance. FIG. 3 shows a curve 28 of $Q_{EQ}$ versus applied voltage $V$. Point $A$ on curve 28 is the break point voltage which is related to the dielectric thickness and occurs at the point at which the charge dependence goes from $Q_{EQ} \alpha V$ to $Q_{EQ} \alpha V^{1/2}$ which for CaF$_2$ about 0.8 mm thick is about 300 volts. For CaF$_2$, the electret capacitance $C_e$, has been measured to be about $10^{-10}$ farad/cm$^2$ which is about 100 times larger than the geometric capacitance. Therefore, the total charge storage capacity of device 10 is significantly greater than that of any ordinary capacitor, allowing the electret charge storage device to be considerably reduced in size from an ordinary capacitor to achieve the same charge storage capacity.

The temperature dependence of the charging and discharging rates is illustrated by curve 26 of FIG. 2, which shows the variation in depolarization current or discharge rate of device 10 at an applied voltage of 500 volts with the temperature being increased at a rate of 0.5°K per second. The coincidence of the ionic conductivity curve 25 and the depolarization or discharge current curve 26 suggests the conclusion that the electret mechanism is a space charge effect. At a particular temperature called the maximum depolarization temperature at point B on curve 26, the rate of discharge will be maximized. Below this temperature the device obeys the predictable temperature response. Above this temperature, however, the response is not dominated by the electret effect and its response is not of value. To vary this maximum, one need only vary the composition of dielectric 15 and its dominant impurity, since different materials have different responses.

Referring to FIG. 4, there is shown a curve 30 of the time required for device 10, once charged to a given level, to discharge to half that level upon being short-circuited. The curve 30 shows the discharge half-life as a function of the temperature. As the temperature is increased, the discharge half-life decreases and vice versa, again illustrating the temperature dependence of the charging and discharging rate of device 10. It has been determined that the interrelationship between the half-life $t_h$ and the temperature $T$ is given by the relation $$t_h\ \alpha\ \exp[T_{electret}/T]$$

where $T_{electret}$ is an energy parameter characterizing the particular material and its dominant impurity doping concentration. It can be seen more clearly from this expression that the discharge half-life which is an indication of the charge-discharge rate varies according to the temperature and the electret characteristics of the dielectric and its dominant impurity. Thus device 10 can be programmed to give a predictable response. At low temperatures the half-life is so slow as to be not usable. Each material has a particular temperature range at which the electret effect is prevalent. By varying the selection of dielectric and dominant impurity and by varying the concentration of the dominant impurity, the usable temperature range is varied. For any particular selection of materials a variation in temperature of the dielectric 15 provided by heating element 18 varies the charge-discharge rate a striking amount, illustrated in FIG. 4. This is shown by the table below which shows the variation in discharge half-life $t_h$ for $CaF_2$, 0.8 mm thick, ⅓ cm² electrode area, $T_{electret}$ of 15,000°K and a final charge before discharge of $10^{-8}$ coulomb:

| $t_h$ (sec) | 100 | 10 | 1 |
|---|---|---|---|
| T (°K) | 385 | 410 | 435 |

The extreme temperature sensitivity of the device is apparent. For a variation in temperature of 50°K, a variation in discharge half-life of two orders of magnitude is obtained.

Other ionic solids which have been found to exhibit the characteristics herein disclosed with the temperature at which the half-life is 10 seconds given in parenthesis are: LiF (480°K), the alkaline earth halogen $SrF_2$ (460°K), alumina (570°K), and BeO (1,200°K); doped with a dominant rare earth or aluminum. $CaF_2$, an alkaline earth halogen, was studied with impurity concentrations of Ce 5 and 15 ppm and gave the predicted response for varying impurity concentrations.

In summary, by heating the proper dielectric material 15 by heating element 18 we can control the discharge rate of device 10 according to predictable means. By proper selection of dielectric material 15 and its dominant impurity we can control the range of temperatures over which the device is most active. The temperature of dielectric 15 should be high enough so that the electret charging dominates ordinary charging.

Referring to FIG. 5, there is shown the charge storage device used as a remotely read temperature sensor. The device is driven with an A.C. input voltage of particular frequency from A-C source 40 and the electrode current, which is a direct analogy to discharge rate, is measured with voltmeter 41. Because of the bilinear response of the device, i.e., $dQ/dt \propto Q^2$, the output current determined from voltmeter 41 will have strong harmonics. By tuning voltmeter 41 to these harmonics by tuning circuit device 43, spurious background pickup characteristics of the original frequency are avoided. Since the discharging rate depends greatly on temperature, the output current will provide a direct measure of small temperature variations of the dielectric. Dielectric 15 and the dominant impurity should be selected so that the discharge rate is high enough to usefully encompass the measured temperature. With 500 volts input to a 0.3 cm² device, an output sensitivity better than 10 volts per °C. at about 100°C. was measured for $CaF_2$ doped with a dominant impurity of Ce. Note that no heating means are required as the ambient temperature of the environment to be measured will heat the dielectric to the appropriate temperature.

The embodiments of the invention in which an exclusive property or privilege is claimed are defined as follows:

1. A temperature programmable charge storage device, comprising an ionic solid dielectric doped such that the concentration of the most abundant impurity ion is at least six times greater than the concentration of all other impurities combined, a pair of electrodes between which said dielectric is disposed with the electrical conductivity of said electrodes being less than the ionic conductivity of said dielectric, thereby preventing injection of charge carriers from said electrodes into said dielectric.

2. The device of claim 1, further including means for varying the temperature of said dielectric over a predetermined temperature range, said predetermined temperature range extending no greater than the maximum depolarization temperature of the ionic solid dielectric.

3. The device of claim 2 wherein said ionic solid dielectric is chosen from the group consisting of the alkaline earth halides, LiF, BeO and alumina and the most abundant impurity is chosen from the group consisting of the rare earths and aluminum.

4. The device of claim 3 wherein the dielectric is of $CaF_2$.

5. The device of claim 4 wherein the most abundant impurity is Ce.

6. The device of claim 1, further including an A-C voltage source coupled to said electrodes and current measuring means coupled to said electrodes responsive thereto to measure the current therefrom.

7. The device of claim 6, wherein said A-C voltage source supplies an A-C voltage of particular frequency, said device further including tuning means capable of limiting the response of said current measuring means to harmonics of said particular frequency greater than the first harmonic.

* * * * *